(12) United States Patent
Bleier

(10) Patent No.: US 6,827,455 B2
(45) Date of Patent: Dec. 7, 2004

(54) PRECISION OPTICAL DEVICES HAVING PIN MOUNTED REFLECTOR(S)

(75) Inventor: Zvi Bleier, Centerport, NY (US)

(73) Assignee: PLX, Inc., Deer Park, NY (US)

( * ) Notice: Subject to any disclaimer, the term of this patent is extended or adjusted under 35 U.S.C. 154(b) by 0 days.

(21) Appl. No.: 10/816,678

(22) Filed: Apr. 2, 2004

(65) Prior Publication Data

US 2004/0190168 A1 Sep. 30, 2004

Related U.S. Application Data

(62) Division of application No. 10/620,248, filed on Jul. 15, 2003, now Pat. No. 6,752,503.
(60) Provisional application No. 60/395,891, filed on Jul. 15, 2002.

(51) Int. Cl.⁷ .............................................. G02B 7/182
(52) U.S. Cl. ..................... 359/879; 359/872; 359/856; 359/857; 359/861
(58) Field of Search ........................ 359/879, 871–872, 359/856–861, 529–530; 354/219–220

(56) References Cited

U.S. PATENT DOCUMENTS

| 3,977,765 A | 8/1976 | Lipkins |
| 4,065,204 A | 12/1977 | Lipkins |
| 4,319,804 A | 3/1982 | Lipkins |
| 4,367,922 A | 1/1983 | Lipkins |
| 5,024,514 A | 6/1991 | Bleier et al. |
| 5,301,067 A | 4/1994 | Bleier et al. |
| 5,335,111 A | 8/1994 | Bleier |
| 5,361,171 A | 11/1994 | Bleier |
| 5,589,991 A | 12/1996 | Bleier |
| 6,561,027 B2 | 5/2003 | Rendahl et al. |

*Primary Examiner*—Mohammad Sikder
(74) *Attorney, Agent, or Firm*—Kaplan & Gilman, LLP; Michael R. Gilman

(57) ABSTRACT

A precision optical devices having pin mounted reflector(s) are provided. The precision optical device, comprising first and second side panels, the first side panel having a hole formed therein, a first reflector comprising a first reflecting surface and a mounting pin extending from a first edge of the first reflector, the mounting pin received within the hole formed in the first side panel for mounting the first reflector between the panels at a first end of the panels, and a second reflector comprising at least a second reflecting surface, mounted between the side panels at a second end thereof in an orientation so that an incident light ray reflecting off of any of the reflecting surfaces is reflected to and off the other(s) of the reflecting surfaces in a direction substantially parallel to the incident light ray.

17 Claims, 8 Drawing Sheets

PRECISION OPTICAL DEVICES HAVING PIN MOUNTED REFLECTOR(S)

This application claims the benefit of U.S. Provisional Patent Application Ser. No. 60/395,891, entitled "LATERAL TRANSFER RETROREFLECTOR AND/OR PERISCOPE WITH PIN MOUNTED MIRROR PANEL ASSEMBLY," filed Jul. 15, 2002, and is a divisional of application Ser. No. 10/620,248, filed Jul. 15, 2003, now U.S. Pat. No. 6,752,503, which applications are incorporated by reference herein in their entireties.

BACKGROUND OF THE INVENTION

This invention relates to the field precision optical devices, and more particularly, to mirror panels for retroreflectors, lateral transfer retroreflectors and periscopes.

Retroreflectors are old in the art. A retroreflector receives and reflects an incident light ray so that the incident and reflected light rays travel along parallel paths in opposite directions; i.e., the retroreflector reflects the incident light ray back in the direction from which it came, along a substantially parallel path. A retroreflector normally consists of three optically flat reflecting surfaces formed together in such a way that the each of the three reflecting surfaces are perpendicular to each other. Only in this configuration can the incident and reflected light rays hope to be parallel. Hence, the achievement of reflective parallelism between the incident and reflected light rays depends on both the flatness and the perpendicularity of the three mirror panels.

A lateral transfer retroreflector is similar in construction to a retroreflector, except that one of the mirror panels is offset from the other two, thereby allowing the reflected light ray to not only be reflected back in a parallel orientation to the incident ray, but also at a distance equal to the particular offset distance of the third mirror panel. Such an assembly is described in detail in co-pending U.S. patent application Ser. No. 09/894,207, which is incorporated herein by reference.

Periscopes are also old in the art, and are meant to take an incident light ray and reflect it off of two mirror panels, in a direction substantially parallel to and in the same direction as the incident ray. So, for example, the most known use for a periscope is in a submarine. Here the person, situated below the surface of the water can nevertheless see above the water surface. This is accomplished because what the person is seeing are hundreds of incident light rays entering the part of the periscope above the water, reflecting off of a mirror panel also above the water, to a mirror panel near the person, below the water (i.e., offset in position from the mirror panel above the water), which is then reflected to the person's eye. While most common periscope usage does not require exacting parallelism between the incident and reflected rays, there are many uses of periscopes that do require such exacting parallelism.

Even retroreflectors, lateral transfer retroreflectors and periscopes made of highly flat mirror panels can lose the parallelism between the incident and reflected light rays, i.e., their accuracy, if they are exposed to physical stresses. Typical examples of the types of stresses that can reduce the accuracy of one of these devices are mass, thermal expansion and contraction of the substrate material from which the assembly of the parts of the device are made, or even deflection of the reflective surfaces during the process of curing the adhesive which typically joins members of the device to each other; i.e., as the adhesive dries, it shrinks and thereby causes pulling stresses to be exerted upon the various elements of the device. If the accuracies of the device are needed to be extremely high then even the smallest of the above stresses causing deflection of the reflective surface of one of the mirror panels will be unacceptable.

As indicated, retroreflectors, lateral transfer retroreflectors and periscopes are old in the art. Examples of prior art retroreflectors and lateral transfer retroreflectors are described in the following patents:

U.S. Pat. No. 3,977,765 to Lipkins, discloses a retroreflector mounted to a support structure through means of applying an adhesive into the joints formed between joined members of the retroreflector and the support structure.

U.S. Pat. No. 4,065,204 also to Lipkins, discloses a lateral transfer retroreflector consisting of a base, a roof reflector having two reflecting plates and a third reflector. The base acts as an extension element for the third reflector in order to provide the offset of the third reflector from the roof reflector to produce the lateral displacement therebetween.

U.S. Pat. No. 5,024,514 to Bleier and Lipkins, discloses a lateral transfer retroreflector having a tubular member, a roof mirror and a mirror panel. Both the roof mirror and mirror panel are attached to the tubular member by use of three co-planar mounting pads.

U.S. Pat. No. 5,301,067 to Bleier and Lipkins, discloses a high accuracy periscope assembly comprised of a hollow tubular member and two mirror panels. The mirror panels are adhered to the tubular member on slanted surfaces of the tubular member along mounting pads.

U.S. Pat. No. 5,361,171 to Bleier, discloses a lateral transfer retroreflector having a fixed-length tubular member, a roof mirror secured within a channel portion extending from an end of the tubular member and a mirror panel attached to the tubular member at the opposite end from the roof mirror and roof mirror panel.

None of the above prior art provides the configuration of the retroreflector and periscope of the present invention, particularly the configuration of the pin mounted mirror panel. It would be desirable to be able to adhere components of precision optical devices together in such a manner as to minimize stresses between the components upon curing, while achieving easy and accurate alignment of the components.

SUMMARY OF THE INVENTION

In accordance with the invention, precision optical devices having pin mounted reflector(s) are provided. The precision optical device, comprising first and second side panels, the first side panel having a hole formed therein, a first reflector comprising a first reflecting surface and a mounting pin extending from a first edge of the first reflector, the mounting pin received within the hole formed in the first side panel for mounting the first reflector between the panels at a first end of the panels, and a second reflector comprising at least a second reflecting surface, mounted between the side panels at a second end thereof in an orientation so that an incident light ray reflecting off of any of the reflecting surfaces is reflected to and off the other(s) of the reflecting surfaces in a direction substantially parallel to the incident light ray.

Accordingly, it is an object of the present invention to provide an improved reflector for a precision optical device.

A further object of the invention is to provide an improved reflector for a precision optical device having a mounting pin instead of a mounting pad.

It is a further object of the invention to provide an improved lateral transfer retroreflector utilizing the improved mounting pin of the improved reflector.

Yet another object of the invention is to provide an improved periscope assembly utilizing the improved mounting pin of the improved reflector.

Other objects of the invention will in part be obvious and will in part be apparent from the following description.

The invention accordingly comprises assemblies possessing the features, properties and the relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

The improved reflectors of the subject invention are mirror panels useful in constructing precision optical devices, such as, but not limited to, lateral transfer retroreflectors ("LTRs"), periscopes and interferometers. In particular, the invention disclosed provides a new construction in the formation and mounting of the reflector to the assemblies that make up the optical devices.

Figure 1:
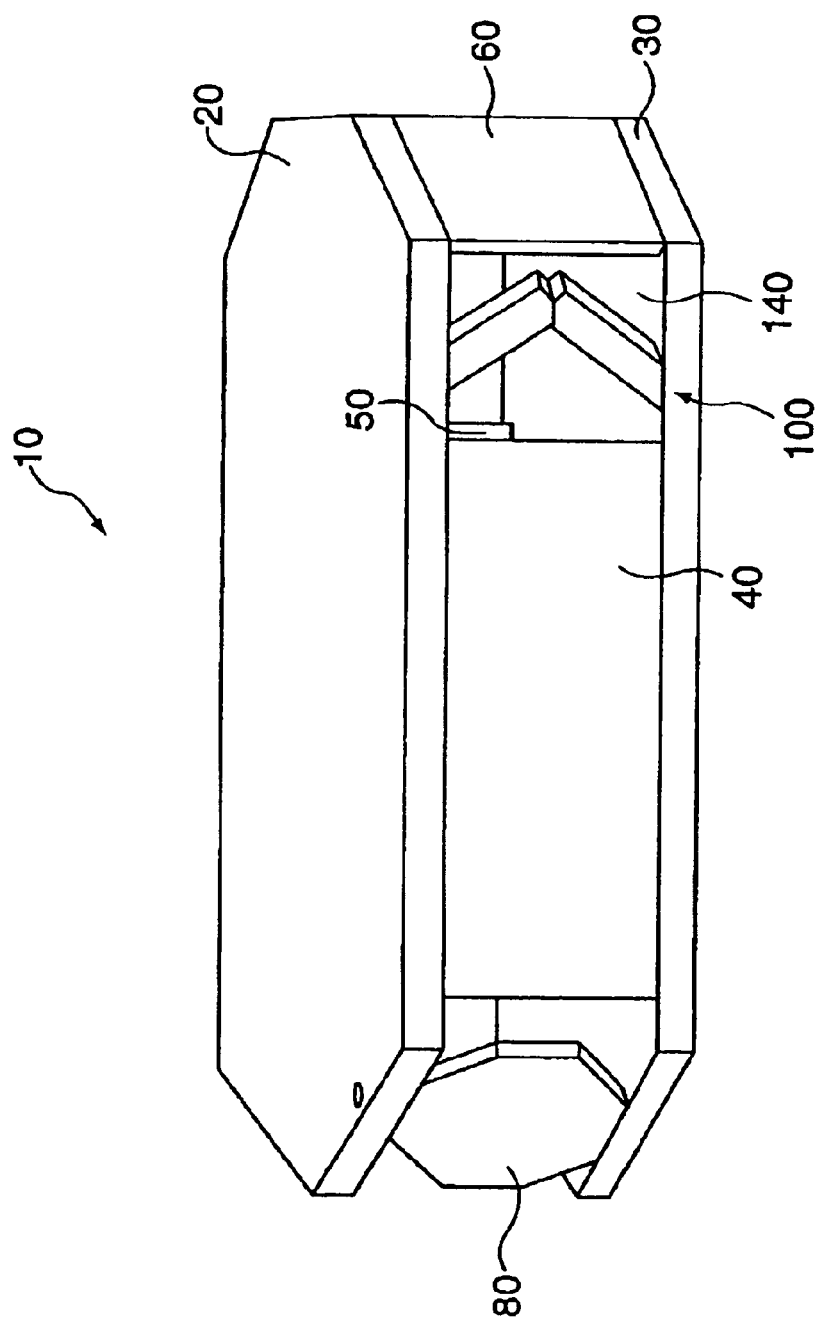
FIG. 1 is a perspective view of the lateral transfer retroreflector of the present invention.

Turning first to a brief discussion of the LTR structure, FIG. 1 illustrates that LTR 10 of the present invention comprises first and second longitudinally extending side panels 20 and 30, supports or connectors 40, 50 and 60, roof mirror assembly 100 and mirror panel 80, although it is not necessary that every one of these elements be present for the LTR structure of FIG. 1 to function pursuant to the invention.

Figure 3:
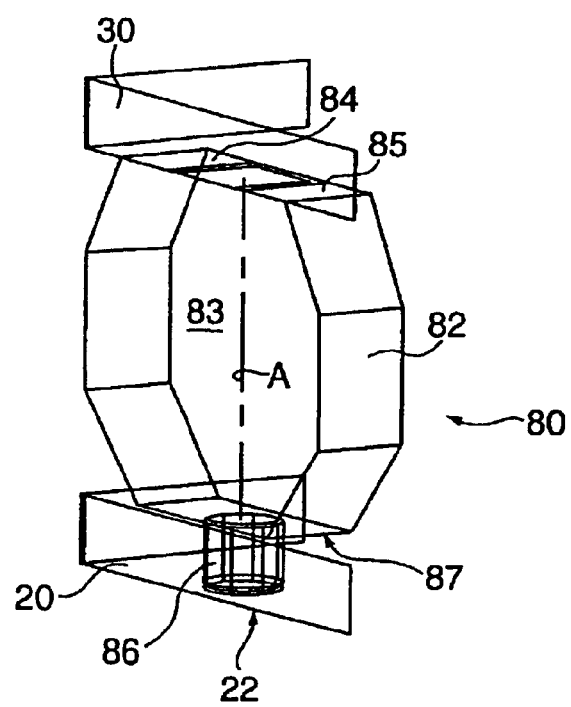
FIG. 3 is a perspective view of a pin mounted mirror panel of the invention mounted between a pair of side supports.

Turning to mirror panel 80, as shown in FIG. 3, it is seen that in the preferred embodiment assembly 80 comprises a panel 82 having a reflective surface 83, two mounting pads 84 and 85 and a surface 87 from which mounting pin 86 extends. In particular, panel 82 is adhered to member 30 of LTR 10 at mounting pads 84 and 85, while in place of a mounting pad on the opposite side of panel 82, panel 82 is adhered to member 20 of LTR 10 by the adherence of pin 86 within a hole 22 of panel 20. It is also anticipated that mounting pin 86 not be preliminarily connected to mirror panel 80, but later adhered thereto during the construction of the precision optical device.

The manner of mounting panel 82 to LTR 10 using three mounting points provides a kinematic mount, which is preferred but is not mandatory. Further, assuming one material (such as quartz) is used for all of the members of LTR 10, including side panels 20 and 30, support panels 40, 50 and 60, roof mirror assembly 100, mirror panel 82 and pin 86, all of these members will expand and contract uniformly, as they will all have the same coefficient of thermal expansion, thereby helping to reduce distortion of the device.

As seen in FIG. 1, the invention anticipates that on the other side of LTR 10 from mirror panel 82 is a roof mirror assembly 100. In the particular invention, roof mirror assembly 100 is substantially identical to that of the roof mirror assembly of applicant's prior pending patent application Ser. No. 09/894,207, but it is to be understood herein that any known or as yet unknown manner of constructing a roof mirror is anticipated herein.

Roof mirror assembly 100 is best seen in FIGS. 4–7. Roof mirror assembly 100 comprises a pair of mirror panels 102 and 112, and a pair of mounting blocks 140 and 160.

Figure 2:
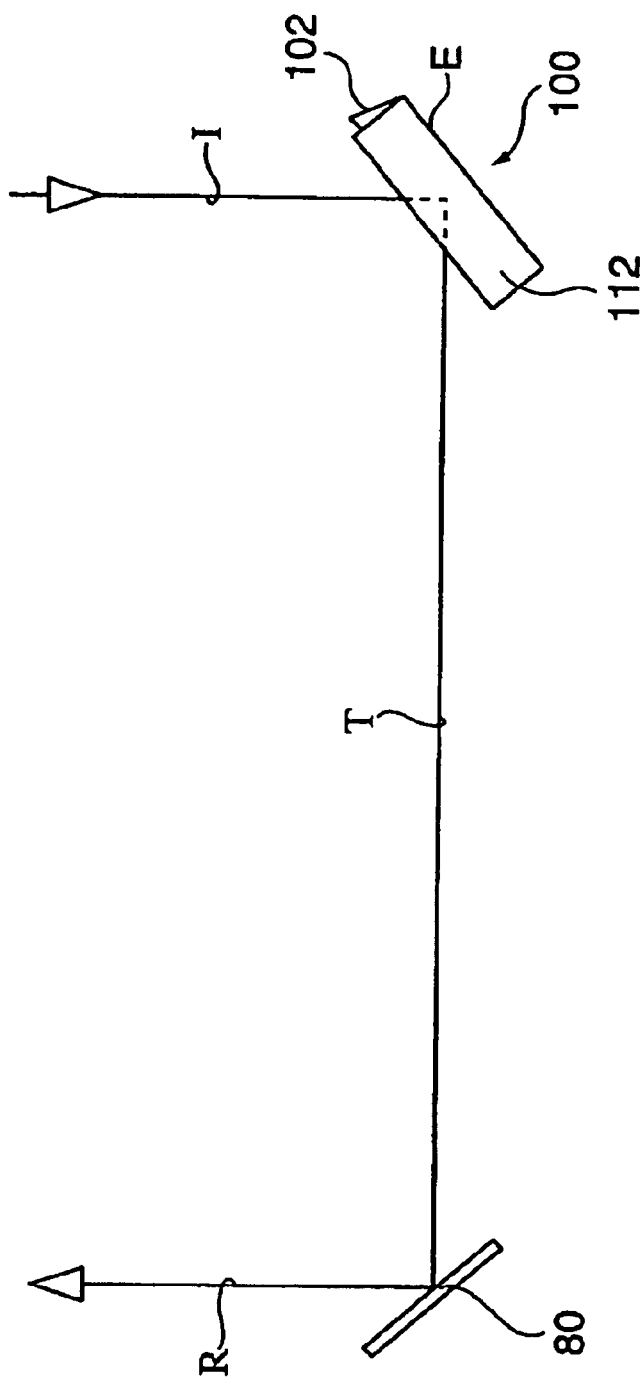
FIG. 2 is a diagrammatic representation of a light ray trajectory in a lateral transfer retroreflector.

Mirror panels 102 and 112 have reflective surfaces 104 and 114, respectively, which reflective surfaces are in reflective relation with reflective surface 83 of mirror panel 82 (see FIG. 2). In particular, reflective surface 104 is substantially perpendicularly oriented to reflective surface 114, and reflective surface 83 is itself oriented substantially perpendicularly to both reflective surfaces 104 and 114. This mutually perpendicular orientation of the three reflective surfaces of LTR 10 essentially duplicates the construction of a Hollow™ retroreflector, as is known in the art.

Figure 4:
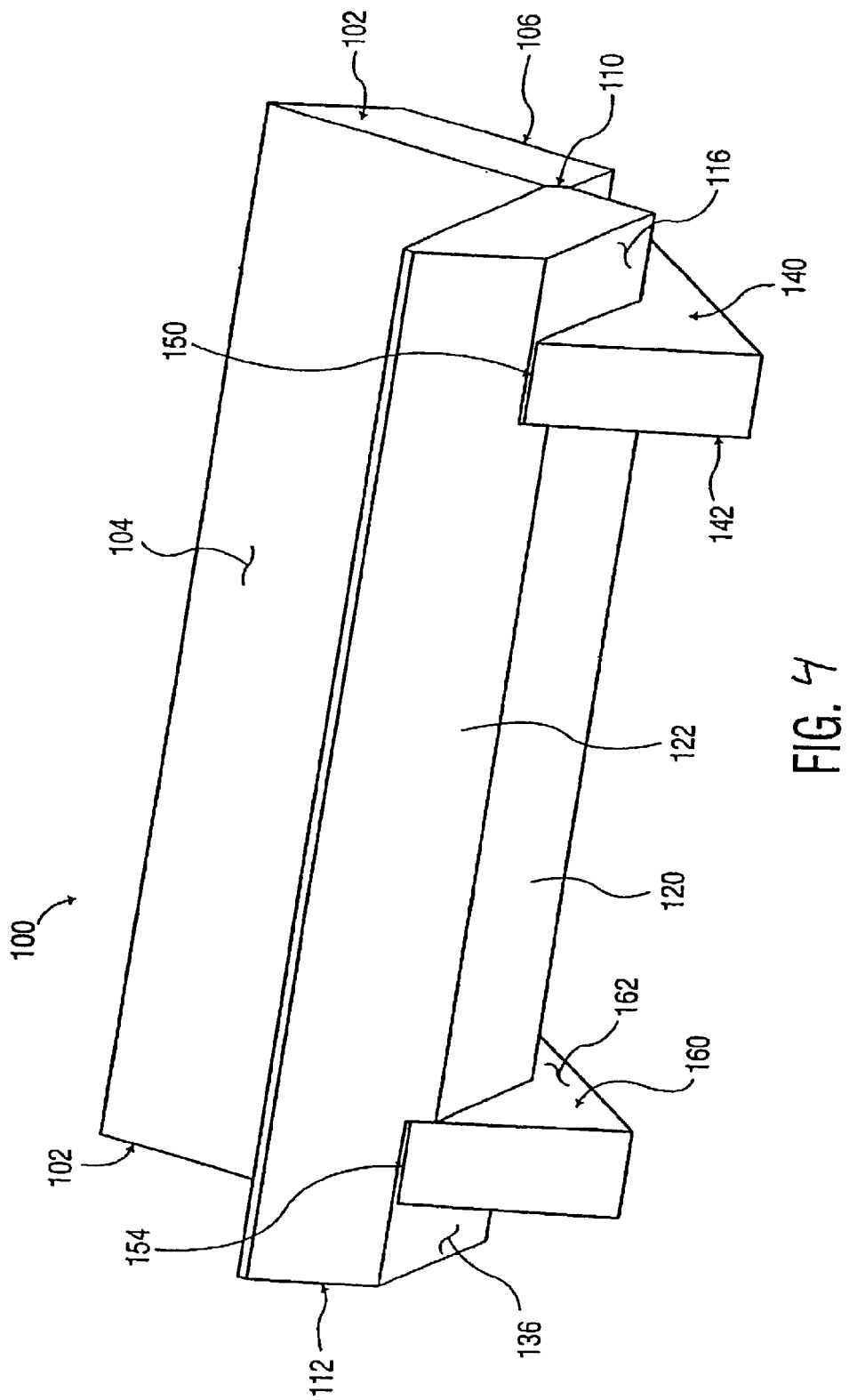
FIG. 4 is a perspective view of a roof mirror assembly for use in the invention.
Figure 5:
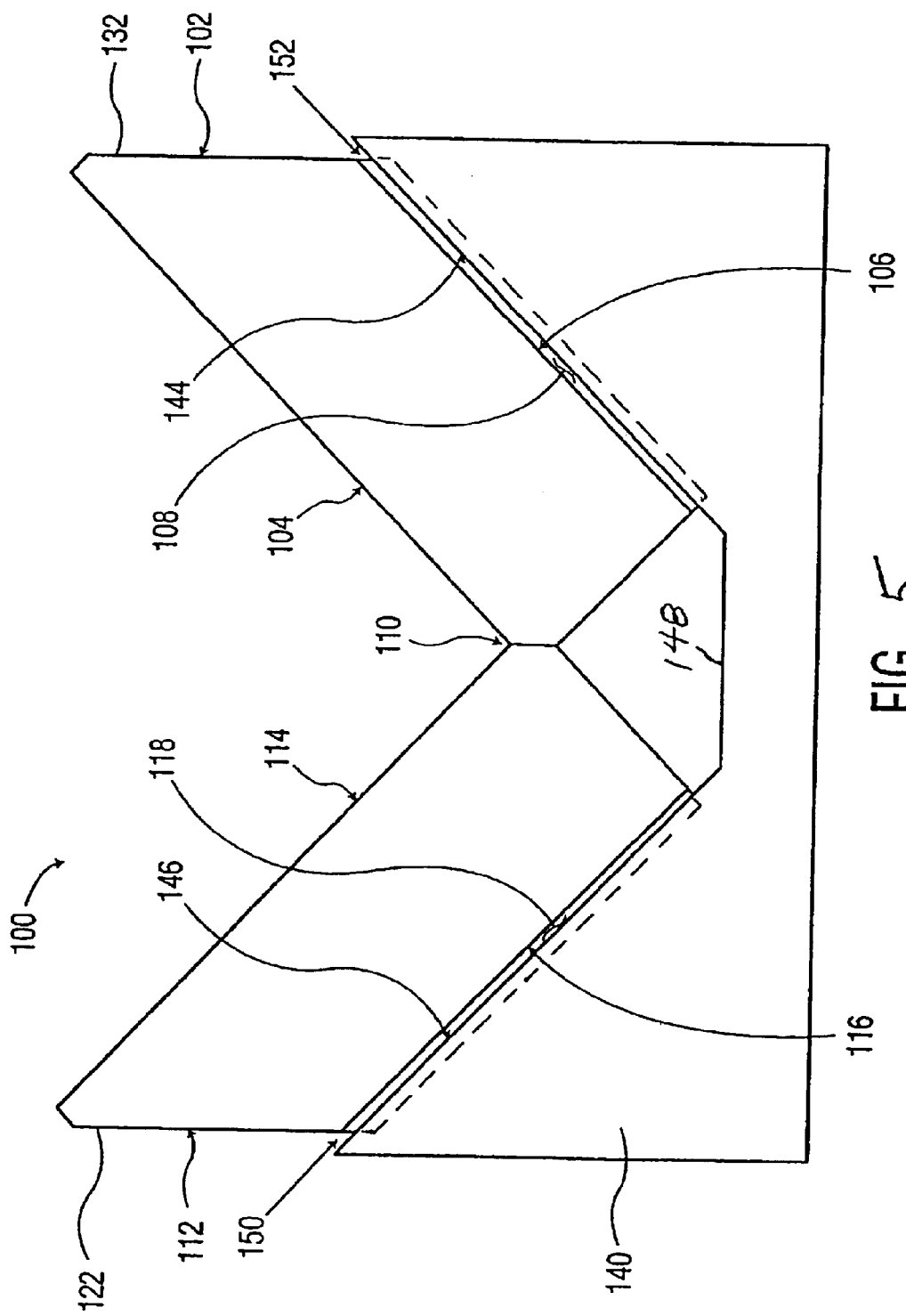
FIG. 5 is a first end elevation view of the roof mirror of FIG. 4.
Figure 6:
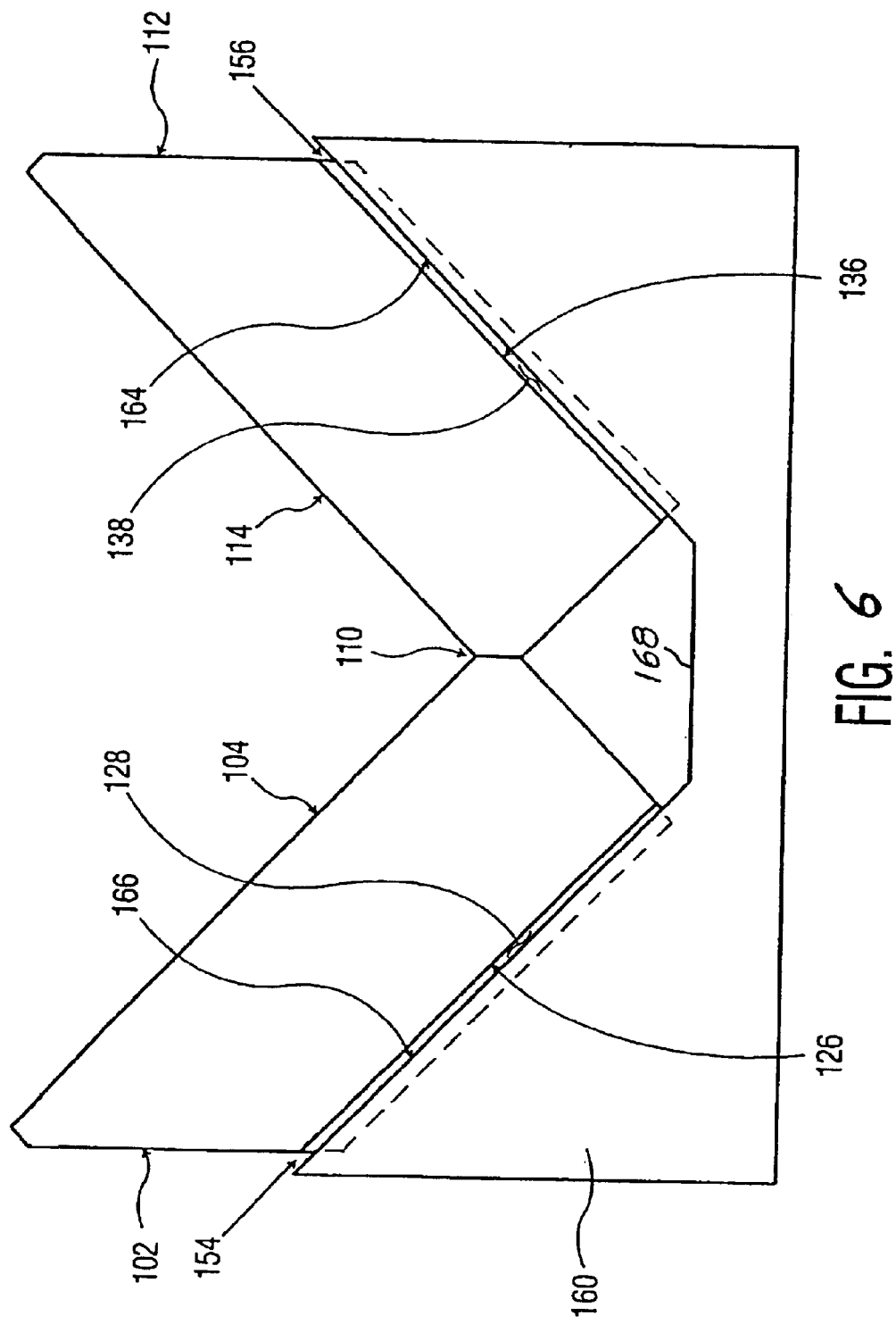
FIG. 6 is a second end elevation view of the roof mirror of FIG. 4.
Figure 7:
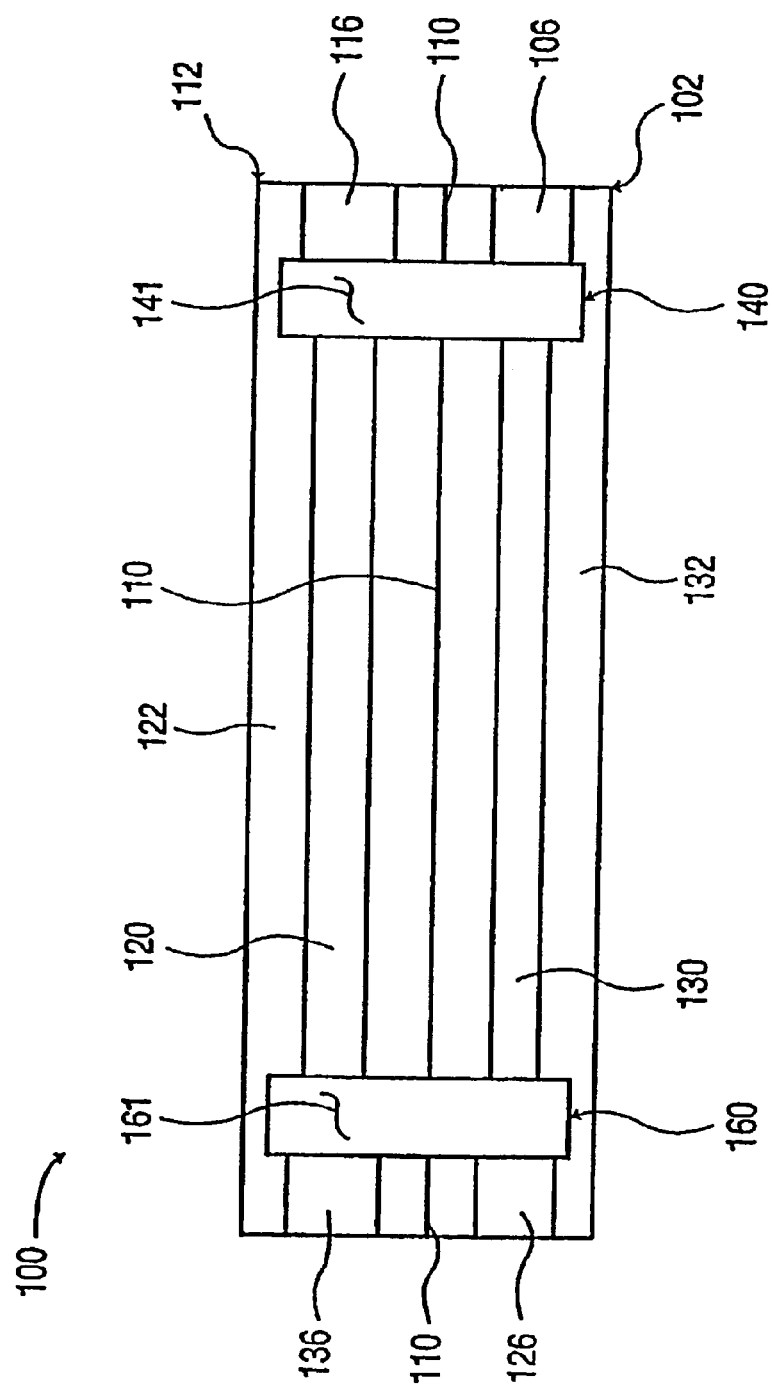
FIG. 7 is a bottom plan view of the roof mirror of FIG. 4.

Referring to FIGS. 4–6, mirror panels 102 and 112 are seen to be adhered together at miter joint 110, although other joints/connections are anticipated herein. In order to create miter joint 110, the attachment surfaces of mirror panels 102 and 112 which are joined together to create miter joint 110, are at substantially 45 degree angles to reflective surfaces 104 and 114, so as to create the perpendicularity between the reflective surfaces upon creation of miter joint 110, and the associated reduction of distortive forces, as earlier discussed.

Continuing with a discussion of FIGS. 4–6, it is seen that connected together panels 102 and 112 are finally formed into a secure roof mirror assembly through the mounting of back surfaces of panels 102 and 104 to portions of surfaces 142 and 162 of mounting blocks 140 and 160. In so mounting panels 102 and 104 to blocks 140 and 160, air gaps 150, 152, 154 and 156 are created between surfaces of mounting blocks 140 and 160 and surfaces 106 and 126 of panel 102, and surfaces 116 and 136 of panel 112 (see FIGS. 5 and 6).

As is further seen in FIGS. 5 and 6, the back surfaces of panels 102 and 112 that are adhered to mounting blocks 140 and 160 as discussed above, are surfaces 108 and 128 for panel 102, and surfaces 118 and 138 for panel 112. In construction it is preferred, but not mandatory, that surfaces 108/128 and 118/138 be substantially perpendicular in orientation to miter joint 110. Such a construction helping to ensure that any substantial distortional effects due to thermal expansion/contraction of panels 102 and 112 and/or block 140 and 160 will be in a direction substantially perpendicular to a longitudinal axis for roof mirror assembly 100; i.e., perpendicular to the planes of reflective surfaces 104 and 114.

Turning again to FIG. 1, it is seen that roof mirror assembly 100 is secured to LTR 10 by way of connection between bottom surfaces 141 and 161 of blocks 140 and 160 to member 60.

Figure 8:
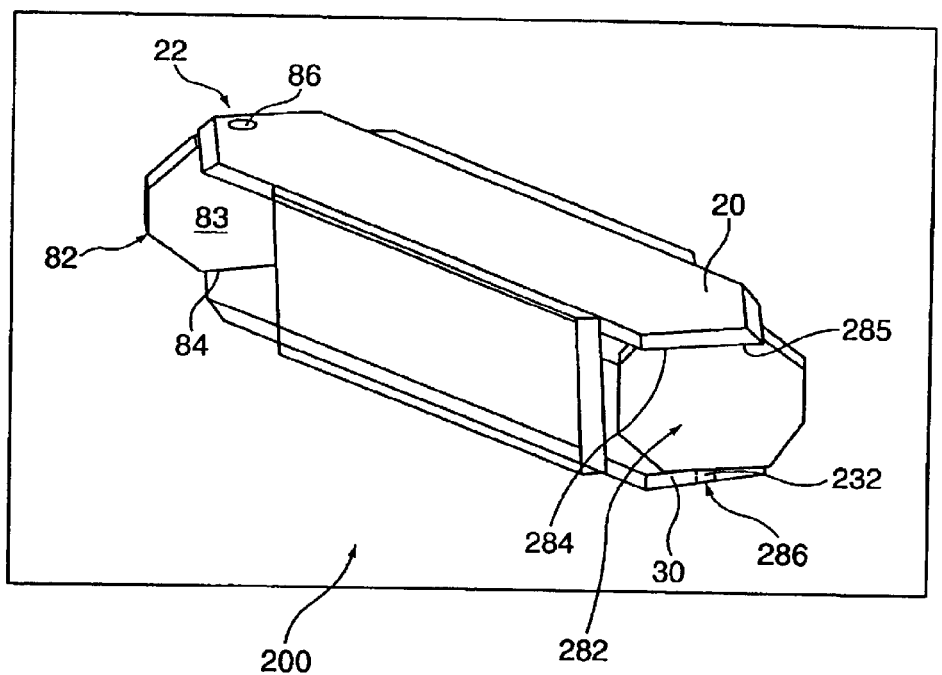
FIG. 8 is a perspective view of a periscope assembly according to the present invention.

The invention also anticipates that instead of a lateral transfer retroreflector being created, a periscope 200 is created, as seen in FIG. 8. Periscope 200, instead of having a roof mirror assembly at one end, has a second mirror panel 282 which, apart from being inverted to that of panel 82 (therefore having its pin 286 extending through member 30, as opposed to member 20), is substantially identically constructed, it being understood, however, that it is not mandatory for panel 282 to be inverted to panel 82. In particular, pin 286 of periscope 200 is adhered within a hole 232 of member 30 of periscope 200, while mounting pads 284 and 285 of mirror panel 282 are adhered to member 20 of periscope 200.

According to the light path diagram shown in FIG. 2, mirror panel 80 is mounted at a first end of an exemplary lateral transfer retroreflector. At the other end of the lateral transfer retroreflector, roof mirror 100, comprising mirror panel 102 mounted in perpendicular relation to mirror panel 112, is mounted. An incident light beam I impinges one of mirror panel 102 or mirror panel 112. By virtue of the perpendicular relation of mirror panels 102 and 112, the light beam is reflected to the other of mirror panel 102 or 112 and then is reflected as intermediate light beam T in a direction perpendicular to incident light beam I and toward mirror panel 80. Upon contacting mirror panel 80, the light beam is reflected off as reflected light beam R that is parallel to, but laterally offset from and in an opposite direction to, incident light beam I. As will be understood by those skilled in the art, whether incident light ray I impinges mirror panel 102 or 112 first, the resultant reflected light ray R achieves a parallel orientation with respect to incident light ray I. Further, a similar light path diagram could be drawn for the embodiment when periscope 200 replaces roof mirror 100. The only difference in such a diagram (other than the fact that the two mirror panels 102 and 112 of the roof mirror are replaced with a single mirror panel 282 for the periscope) is that reflected light beam R will travel in the same direction, and substantially parallel to, the direction of incident beam I.

Unless otherwise expressly indicated, when used throughout this document the term "substantially" shall have the meaning of "approximation", not "magnitude"; i.e., it shall have the meaning, "being largely but not wholly that which is specified." See, *Webster's Ninth New Collegiate Dictionary,* Merriam-Webster Inc., 1989.

It will thus be seen that the objects set forth above, among those made apparent from the preceding description, are efficiently attained, and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed is:

1. A precision optical device, comprising:
    first and second side panels, said first side panel having a hole formed therein;
    a first reflector comprising a first reflecting surface and a mounting pin extending from a first edge of said first reflector, said mounting pin received within said hole formed in said first side panel for mounting said first reflector between said panels at a first end of said panels; and
    a second reflector comprising at least a second reflecting surface, mounted between said side panels at a second end thereof in an orientation so that an incident light ray reflecting off of any of said reflecting surfaces is reflected to and off the other(s) of said reflecting surfaces in a direction substantially parallel to said incident light ray.

2. A precision optical device as recited in claim 1, said first reflector further comprising at least one mounting pad extending from at least a second edge thereof for mounting said first reflector to said device.

3. A precision optical device as recited in claim 2, said at least one mounting pad comprising first and second mounting pads.

4. A precision optical device as recited in claim 3, said first mounting pad located along said second edge of said first reflector and said second mounting pad located along a third edge of said first reflector.

5. A precision optical device as recited in claim 4, wherein said second and third edges of said first reflector define a common edge of said first reflector.

6. A precision optical device as recited in claim 5, said first edge of said first reflector being opposite said common edge of said first reflector.

7. A precision optical device as recited in claim 5, said first and second mounting pads being co-planar.

8. A precision optical device as recited in claim 5, said first and second mounting pads extending from said common edge in such manner as not to touch each other and have a portion of said common edge located therebetween.

9. A precision optical device as recited in claim 8, wherein said common edge of said first reflector does not touch said precision optical device when said first reflector is mounted to said precision optical device.

10. A precision optical device as recited in claim 1, said second reflector comprising a roof mirror assembly, comprising substantially, mutually perpendicular reflecting panels.

11. A precision optical device as recited in claim 10, wherein said first reflector is mounted to said device substantially perpendicular to said reflecting panels of said roof mirror so that a direction of said light ray after reflecting off of said roof mirror and said first reflector is opposite to a direction of said incident light ray.

12. A precision optical device as recited in claim 1, said second reflector further comprising a mounting pin for receipt within a hole formed in said second panel for mounting said second reflector between said panels.

13. A precision optical device as recited in claim 12, wherein when said second reflector is mounted between said panels said second reflecting surface is substantially parallel to said first reflecting surface of said first reflector so that a direction of said light ray after reflecting off of said first reflector and said second reflector is substantially the same as a direction of said incident light ray.

14. A precision optical device as recited in claim 13, said mounting pin configured to fit snugly into said hole.

15. A precision optical device as recited in claim 1, said mounting pin configured to fit snugly into said hole.

16. A precision optical device as recited in claim 1, wherein all components of said device are made of the same material.

17. A precision optical device as recited in claim 16, wherein said material is quartz.

* * * * *